Patented Sept. 9, 1930

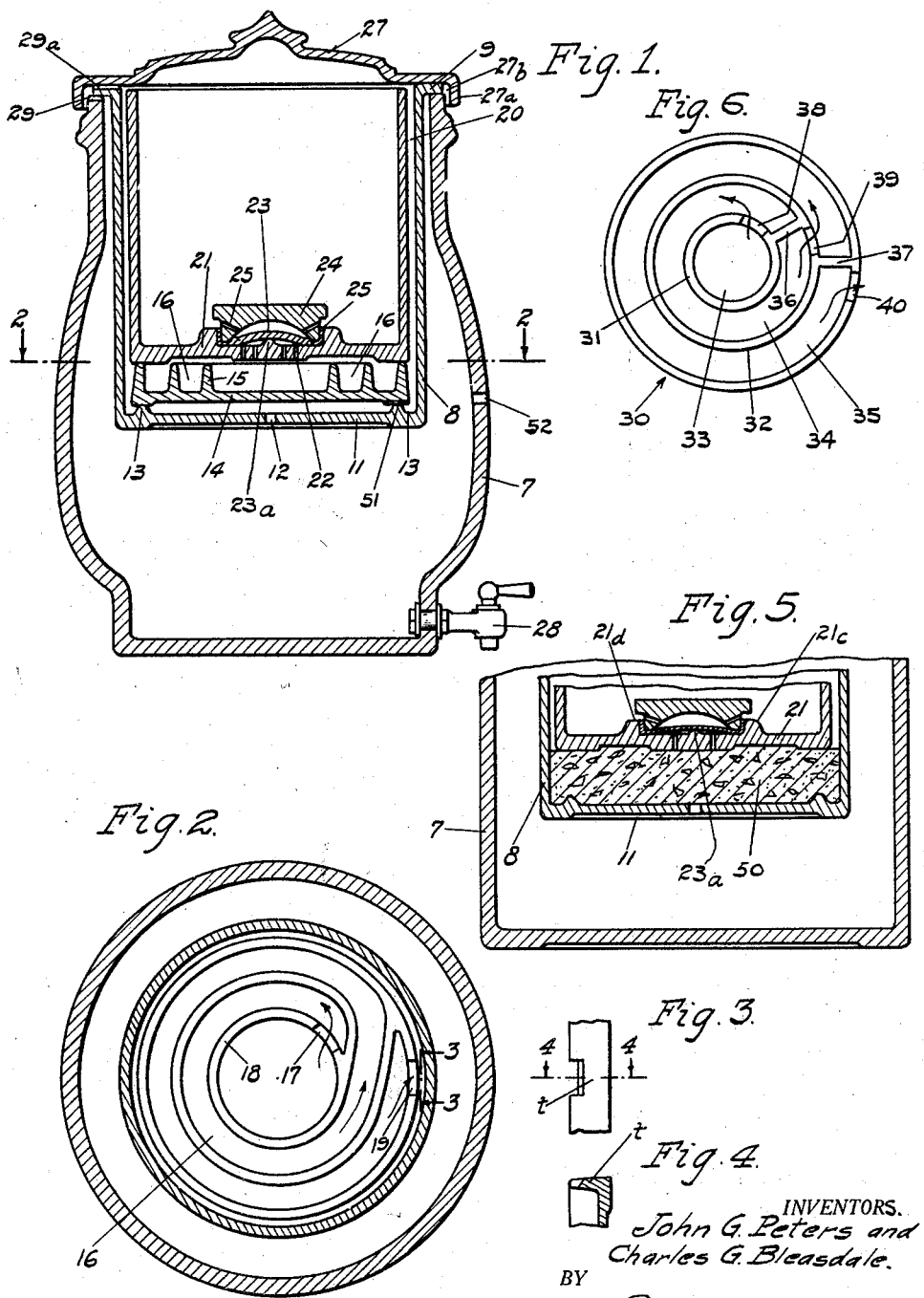
Sept. 9, 1930.  J. G. PETERS ET AL  1,775,355
WATER FILTER
Filed Feb. 16, 1929
INVENTORS.
John G. Peters and
Charles G. Bleasdale.
BY
ATTORNEY.

1,775,355

UNITED STATES PATENT OFFICE

JOHN G. PETERS, OF BEVERLY HILLS, AND CHARLES G. BLEASDALE, OF VAN NUYS, CALIFORNIA

WATER FILTER

Application filed February 16, 1929. Serial No. 340,468.

This invention relates to an improved filter construction which is designed to circulate the liquid being filtered, in such a manner as more efficiently to separate the impurities therefrom.

An object of the invention is to provide a very simple and compact arrangement of parts for securing a relatively long runway along which the liquid is conducted in order to afford time and space for its efficient purification.

A further object of the invention is to provide, in conjunction with the circulatory feature above mentioned, a filter construction in which all parts of the device may be readily disassembled, thus affording free access thereto for cleaning, and which, after cleaning, may be readily reassembled for further use. Still other objects and advantages may hereinafter appear.

Referring to the accompanying drawings, which illustrate what is at present deemed a preferred embodiment of the invention, Fig. 1 is a vertical mid-section of the filter, completely assembled.

Fig. 2 is a plan view of the circulatory member.

Fig. 3 is an elevational detail of the outlet means, viewed from line 3—3 on Fig. 2.

Fig. 4 is a section on line 4—4 of Fig. 3.

Fig. 5 is a mid-section of a modification, the upper portion of the device being broken away in order to contract the view.

Fig. 6 is a plan view of a modification of the basin for circulating the liquid being filtered.

Referring in detail to the drawings, within the main outer container or receptacle 7 is suspended the intermediate receptacle 8 by means of the outwardly directed peripheral flange 9 of said receptacle 8, said flange resting upon the upper end of said container 7.

Receptacle 8 is provided with a bottom 11 having a central outlet 12, and an upstanding circular rib 13 near the periphery of its upper face. Upon said rib 13 rests a circular basin 14 which has formed thereon an upstanding spiral wall 15 whereby is provided a spiral channel 16. The inner end of said channel 16 communicates through opening 17 with a circular collecting wall 18 located centrally of basin 14. The outer or peripheral portion of channel 16 is provided with a discharge port 19.

As shown in Figs. 3 and 4, the port 19 occupies only the upper portion of the circular flange into which it is cut there remaining a threshold portion or wall $t$ beneath said port to provide for the collection of sediment in the body of liquid which is thereby retained in the spiral channel 16 of which said port 19 forms the outlet.

Upon basin 14 is supported an inner receptacle 20 having in the central portion of its bottom 21 outlet means 22 which communicate with the space inclosed by the collecting wall 18. The circular layer of porous packing 23 which overlies outlets 22, is held in place by the cap 24 which engages the peripheral portion of said packing and is provided with inlet passages 25. The device is surmounted by a cover 27 and is provided with the usual outlet faucet 28. The term "basin" as used in the description and claims, in reference to part 14, is intended to refer to a basin in the sense of a portable container of the nature of a pan or dish, which is therefore well suited for assembling in combination with the other parts of the filtering apparatus and which may readily be separated therefrom to be cleaned.

The cover 27 is provided with a downwardly directed peripheral flange 27$^a$. The internal diameter of said flange is slightly greater than the external diameters of the outwardly directed flange 9 and of the top portion of the outside container 7, thus providing an air space 27$^b$ within said flange 27$^a$. With this air space communicate air ducts 29 located beneath flange 9 and preferably formed in the upper end of the outside container 7, and the air ducts 29$^a$ at the upper side of flange 9, the latter ducts preferably being cut into said flange 9. The flange 27$^a$ extends downwardly a sufficient distance to overhang the top of the outside receptacle 7 in order to form an efficient dust guard therefor.

The bottom 21 of the inner receptacle 20 is provided with a raised portion 23$^a$, preferably a centrally located boss, which holds a portion of the disc or pad 23 clear of the bottom in order to allow the liquid more readily to pass out through the passages 22.

The bottom 21 of receptacle 20 has an upstanding circular flange 21$^c$ which forms a container for the filtering pad or disc 23. Said disc has an upwardly directed peripheral portion 21$^d$ which fits within said upstanding flange or wall. When the parts are in place the lower edge of the cap 24 engages the angle between the body of disc 23 and said upwardly directed peripheral portion 21$^d$ to hold said disc more securely in place, the weight of the relatively heavy cap 24 being depended upon to hold the peripheral portion of disc 23 firmly against the bottom 21.

The overflow port 52 passes through the outside container 7 at a predetermined height with relation to the bottom of the basin 14 in order to prevent the filtered water from backing up into the unfiltered water.

One or more ducts 51, preferably formed in the under surface of the peripheral portion of the bottom of the basin 14, allow the filtered liquid which escapes through gate 19 (see Fig. 2) to reach the outlet port 12 of the receptacle 8.

In Fig. 5 is shown a modification wherein a layer 50 of charcoal is interposed between the bottom 11 of receptacle 8 and the bottom 23 of the inner receptacle, the basin 14 of Fig. 1 being omitted.

In Fig. 6, the modified form of basin 30 shown is provided with a central upstanding wall 31 and a like wall 32 spaced outwardly therefrom. By this construction a central collecting space 33, an intermediate circular channel 34, and an outer circular channel 35 are provided. The radial cross walls 36 and 37, in conjunction with the gates or ports 38 and 39 determine the course of the liquid from the central space 33 to the outer port or gate 40.

Claims:

1. In a filter, a liquid receiving receptacle having a bottom which is provided with outlet means in its central portion, a basin having a flat bottom which is provided with an upstanding peripheral flange, said flange forming a support which engages the bottom portion of said receptacle near its periphery, said flange having an outlet port therethrough, said basin having within said flange a conduit forming flange to conduct liquid by an indirect course from the outlet means of said receptacle to said port, a supporting receptacle for said basin, the bottom of said supporting receptacle having an upstanding circular rib near its periphery which engages the bottom of said basin near the periphery of the latter in order to support said basin together with the liquid receiving receptacle mounted thereon, said rib permitting inflow of liquid toward the central portion of the bottom of said supporting receptacle, there being an outlet leading from the central portion of the bottom of said supporting receptacle, and an outer receptacle to receive liquid discharged from the last recited outlet.

2. In a filter, a liquid receiving receptacle having a bottom which is provided with outlet means in its central portion, a basin having a flat bottom which is provided with an upstanding peripheral flange, said flange forming a support which engages the bottom portion of said receptacle near its periphery, said flange having an outlet port therethrough, said basin having within said flange a conduit forming flange to conduct liquid by an indirect course from the outlet means of said receptacle to said port, a supporting receptacle for said basin, the bottom of said supporting receptacle having supporting means near its periphery which engages the bottom of said basin near the periphery of the latter in order to support said basin together with the liquid receiving receptacle mounted thereon, said supporting means permitting inflow of liquid toward the central portion of the bottom of said supporting receptacle, there being an outlet leading from the central portion of the bottom of said supporting receptacle, and an outer receptacle to receive liquid discharged from the last recited outlet.

3. In a filter, a basin having a bottom which is provided with an upstanding peripheral flange and having a peripheral outlet port, a liquid-receiving receptacle supported above and upon said basin and having outlet means communicating with the central portion of said basin, said basin having within said peripheral flange a conduit forming flange to conduct liquid by an indirect course from the outlet means of said receptacle to said port, a supporting receptacle for said basin upon which the latter is loosely supported, the bottom of said supporting receptacle having supporting means which engage the basin in order to support it together with the liquid receiving receptacle mounted thereon, said supporting means permitting inflow of liquid toward the central portion of the bottom of said supporting receptacle, there being an outlet leading from the central portion of the bottom of said supporting receptacle, and an outer receptacle to receive liquid discharged from the last recited outlet.

In testimony whereof we affix our signatures.

JOHN G. PETERS.
CHARLES G. BLEASDALE.